United States Patent

Stivani et al.

[11] Patent Number: 5,843,253
[45] Date of Patent: Dec. 1, 1998

[54] METHOD AND DEVICE FOR SEALING A NARROW TAPE TO A HEATSEALABLE STRIP

[75] Inventors: Eros Stivani, Bologna; Fiorenzo Draghetti, Medicina, both of Italy

[73] Assignee: G.D.S.P.A., Bologna, Italy

[21] Appl. No.: 764,240

[22] Filed: Dec. 16, 1996

[30] Foreign Application Priority Data

Dec. 14, 1995 [IT] Italy ................................. B095A0590

[51] Int. Cl.⁶ .................................................. B29C 65/08
[52] U.S. Cl. ......................... 156/64; 156/73.1; 156/359; 156/361; 156/554; 156/580.1; 156/580.2
[58] Field of Search .......................... 156/64, 73.1, 359, 156/361, 554, 555, 580.1, 580.2

[56] References Cited

U.S. PATENT DOCUMENTS

| | | | |
|---|---|---|---|
| 3,651,615 | 3/1972 | Bohner et al. | 53/452 |
| 3,728,199 | 4/1973 | Stanley | 156/554 |
| 4,304,615 | 12/1981 | Siegel | 156/73.3 |
| 4,531,999 | 7/1985 | Persson et al. | 156/580.2 |
| 4,906,318 | 3/1990 | Miyazaki | 156/352 |
| 5,059,277 | 10/1991 | Willhite, Jr. et al. | 56/580.1 |

FOREIGN PATENT DOCUMENTS

| | | |
|---|---|---|
| 2 348 816 | 11/1977 | France . |
| 2 290 498 | 1/1996 | United Kingdom . |
| 89/09730 | 10/1989 | WIPO . |

*Primary Examiner*—James Sells
*Attorney, Agent, or Firm*—Pillsbury Madison & Sutro LLP

[57] ABSTRACT

The method and device for sealing a narrow tape to a strip of heatsealable material in cigarette packing machines, which produce packets of cigarettes protected by an external wrapper made of plastic which can be torn using the said tear tape; to avoid a thermal degradation in the sections of heatsealable strip adjacent to the sealing zone, the present invention envisages sealing the narrow tape to the strip by passing them through a sealing unit, in contact with one another, and joining them with an ultrasound sealer which directs the ultrasound to at least a zone in which the narrow tape and strip overlap; the intensity of the heatsealing action of the ultrasound is controlled and adjusted by elements which detect the feed speed of the narrow tape and strip.

9 Claims, 2 Drawing Sheets

METHOD AND DEVICE FOR SEALING A NARROW TAPE TO A HEATSEALABLE STRIP

BACKGROUND OF THE INVENTION

The present invention relates to a method for sealing a narrow tape to a heatsealable strip. In particular, the present invention relates to a method for sealing a so-called narrow tear tape to a strip of heatsealable material intended, in particular, for use in the creation of a protective external wrapper for cigarette packets in machines which produce the packets.

As is known, when a cigarette packet of the aforementioned type must be opened, the tear tape allows the external wrapper (also commonly known as the overwrap) on the packet to be torn in an easy and immediate manner.

The application by heatsealing of a narrow tear tape to a strip of wrapping material is common practice in the sector for the machines or systems which produce cigarette packets, exploiting the physical characteristics of the strip of material envisaged to form the external wrapper, or overwrap.

For example, the application for a British patent No. 9510915.3, dated 30 May 1995, envisages that a narrow tear tape and a strip of wrapping material be fed in a continuous manner to sealing means which consist of a heating plate with ring-crown shaped sectors and operates in conjunction with a sector of a rotating drive roller which, at least at the sector, sucks both the narrow tape and the strip against its revolving surface. The plate, which is kept at a preset operating temperature, heats the narrow tape and the strip until they are sealed together.

The above referenced method is not very flexible when faced with variations in the feed speed of the narrow tape and the strip of heatsealable material. In fact, the feed speed of the narrow tape and strip may drop temporarily for various reasons. As a result, the time for which the narrow tape and strip remain between the drive roller and the sealing means increases, and may result in excessive, unwanted fusion of the materials on some areas of the narrow tape and strip.

Moreover, given that the strip of wrapping material is much wider than the tear tape, the former is also subjected to significant thermal stress in the areas adjacent to the zone sealed to the tear tape. This phenomenon may lead to a thermal degradation in the material in these areas. The portions of the wrapping strip near to the tear tape which do not actually overlap the latter are thinner than the sealing zone where the tear tape and the strip overlap, and so, even if they absorb the same amount of heat, they are less resistant to thermal degradation than the sealing zone.

To reduce the risk of damage to the portions of strip adjacent to the sealing zone, the operating temperature of the sealing means must be reduced, leading to an increase in the amount of time for which the tear tape and strip must be held in front of the sealing means and, ultimately, slowing down the process.

It may also happen that the portions of strip adjacent to the sealing zone are easily wrinkled and creased by the heat to which they are subjected.

SUMMARY OF THE INVENTION

The main object of the present invention is, therefore, to overcome the aforementioned disadvantages.

The present invention provides a method for sealing a narrow tape to a heatsealable strip, especially in cigarette packing machines, the method including the steps involving feeding the narrow tape and heatsealable strip to a sealing unit in such a way that they overlap and are correctly positioned upon arrival at the unit, characterised in that the sealing of the narrow tape to the heatsealable strip is carried out by feeding the narrow tape and strip, in contact with one another and at the same speed, through the sealing unit, and sealing them together with an ultrasound sealer along the trajectory followed by the narrow tape, directing the ultrasound to at least a zone in which the narrow tape and strip overlap. Some advantages of the present invention are its speed, the notable flexibility to variations in the feed speed of the narrow tape and strip, and the reduced thermal stress on the portions of strip adjacent to the zone in which it is sealed to the tear tape.

The present invention also relates to a device for sealing a narrow tape to a heatsealable strip, especially in cigarette packing machines, the device including means for feeding the narrow tape and the said heatsealable strip in such a way that they overlap, characterised in that it includes ultrasound heatsealing means attached to a sealing unit located on the trajectory followed by the narrow tape which overlaps the strip, both being fed at the same speed through the sealing unit, the heatsealing means being configured and angled in such a way as to operate only upon the zone where the narrow tape and strip overlap.

BRIEF DESCRIPTION OF THE DRAWINGS

The invention will now be described with reference to the accompanying drawings, which illustrate preferred embodiments of the invention and in which.

DETAILED OF THE PREFERRED EMBODIMENTS

Figure 1:
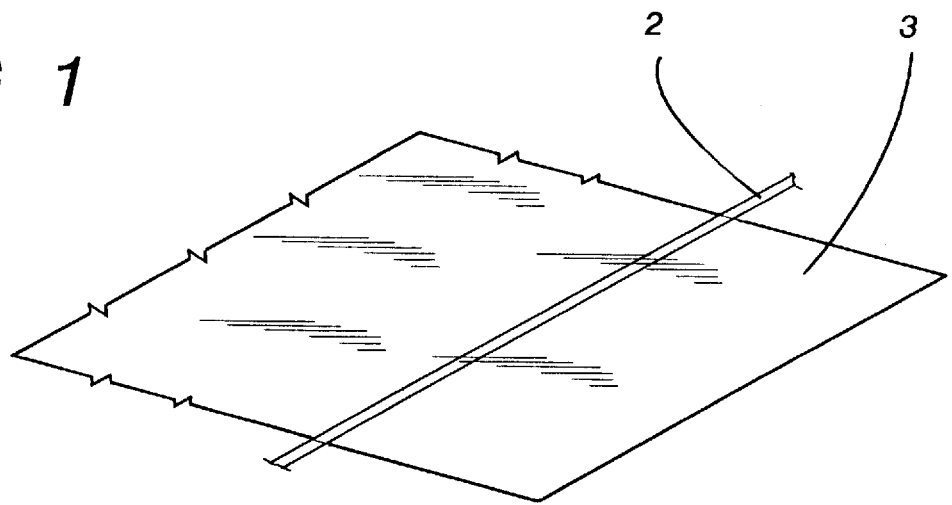
FIG. 1 is a perspective view of the overlap between the tear tape and the strip of wrapping material to be sealed together.
Figure 2:
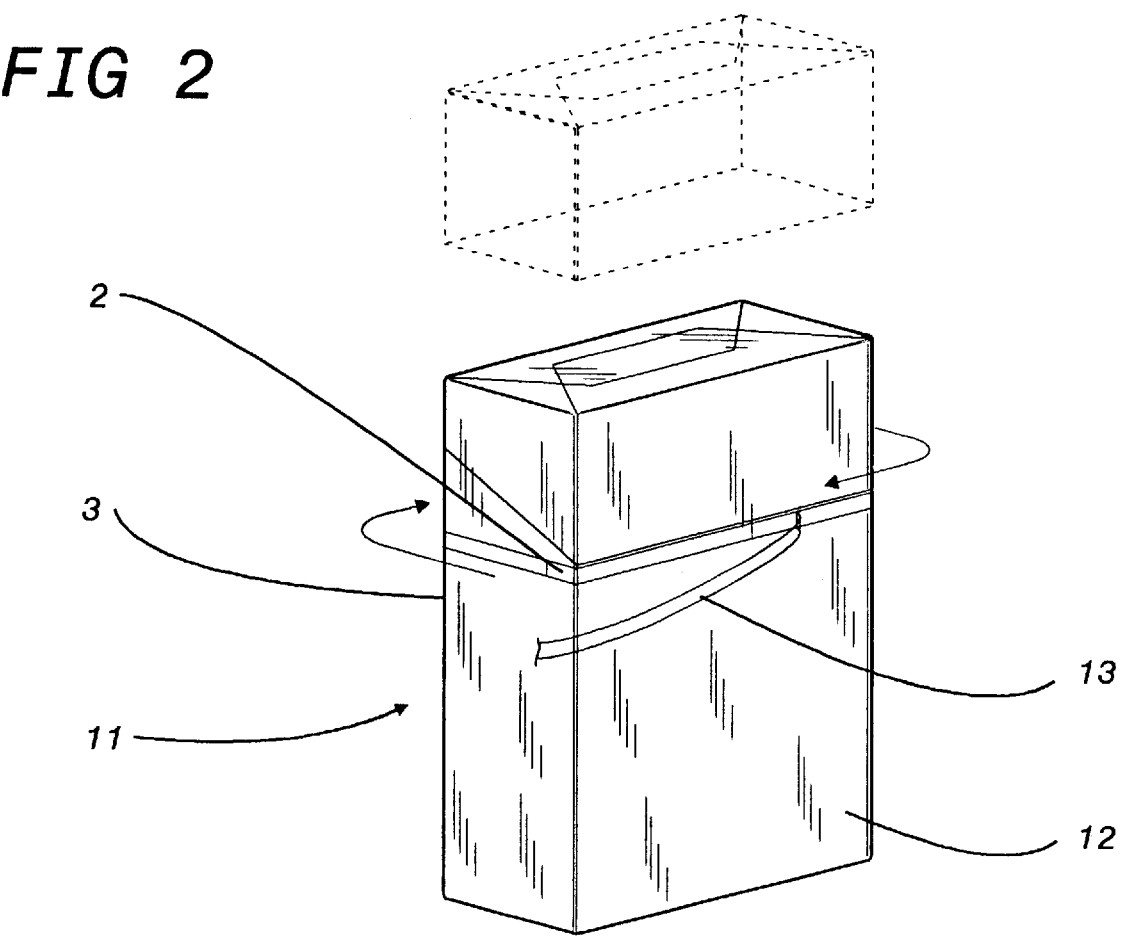
FIG. 2 is a schematic perspective view of a cigarette packet externally protected by a wrapper which has a tear tape.

With reference to the accompanying drawings, the number 1 denotes a device for sealing a narrow tape 2 to a strip of heatsealable material 3; the narrow tape 2 and strip 3 arriving together at a sealing unit, denoted by 15, as shown in FIG. 1. The strip 3 of heatsealable material is the strip of wrapping material from which the sections intended to form the wrappers 12 for cigarette packets 11 are taken, while the tear tapes 13 for the wrappers 12 are taken from the narrow tape 2 (see FIG. 2). As is known, to open a packet 11, a free, deliberately unsealed tab of the tear tape 13 can be gripped and pulled to unwind the tear tape 13; in this way the tear tape 13 tears the wrapper 12, dividing it into two parts, at least one of which, illustrated by a dashed line in FIG. 2 and which may be defined the top of the wrapper 12, can then be removed from the packet 11 so that the packet may be opened and the cigarettes removed.

Figure 3:
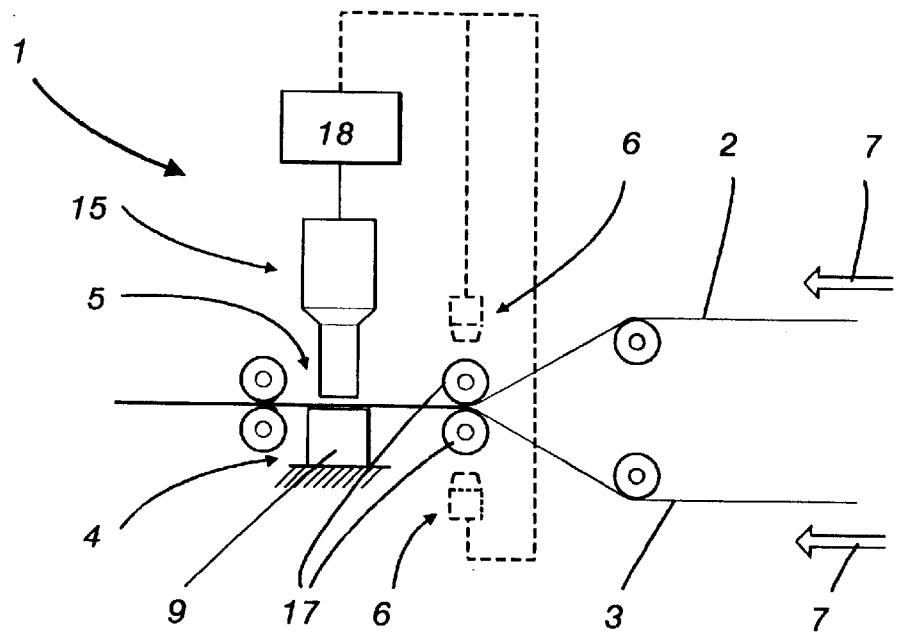
FIG. 3 is a schematic side view of a first possible embodiment of the device for practicing the method of the invention.
Figure 4:
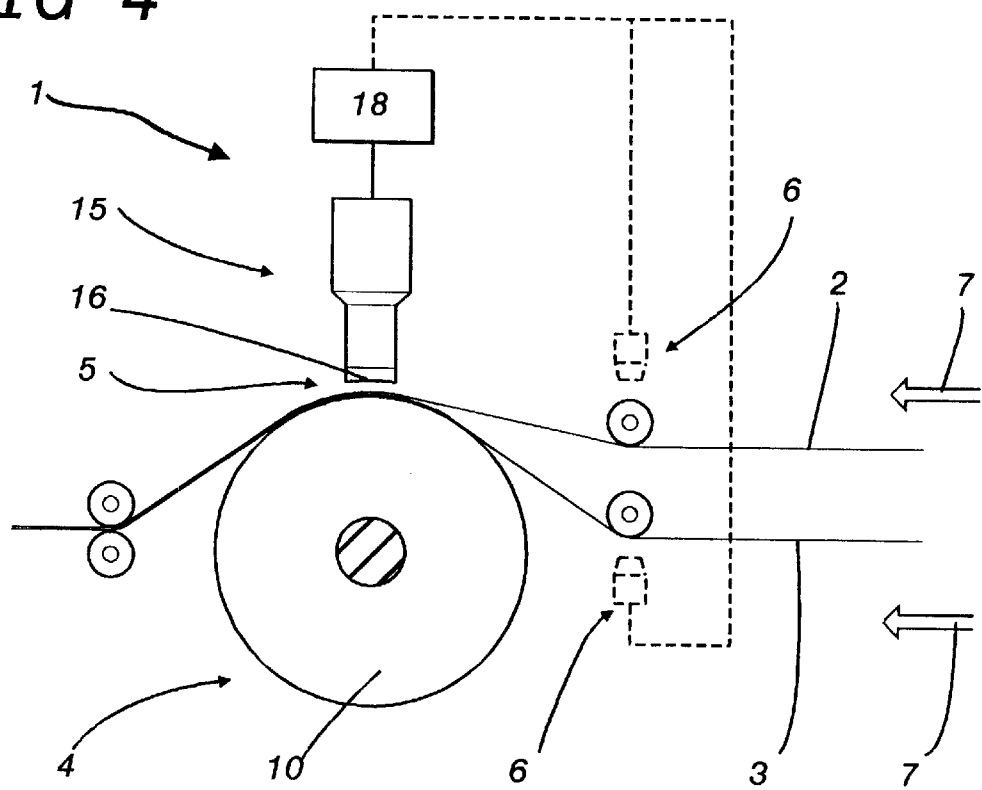
FIG. 4 is a schematic side view of a second possible embodiment of the device disclosed for the actuation of the invention disclosed.

The sealing unit 15 has ultrasound heatsealing means 5, located on the trajectory followed by the narrow tape 2, in contact with the strip 3 and at the same feed speed, along a path which leads through the sealing unit in a direction indicated by the arrow 7 in FIGS. 3 and 4.

The ultrasound heatsealing means 5 are envisaged configured and angled in such a way that they operate only upon the zone where the narrow tape 2 and the strip 3 overlap, and usually include a sealer with a generator, designed to send an alternating current with preset frequency to a sound vibration transducer. The ultrasound is usually directed, within certain limits, to a zone in which the narrow tape 2 and the strip 3 overlap by a width approximately equal to the width of the narrow tape 2.

Moreover, the heatsealing means 5 are controlled and checked by at least one sensor 6 attached to the timing shaft of the cigarette packing machine or system, or to a rotating axis which is kinematically connected to the timing shaft and is part of the feed and handling means of at least the narrow tape 2 or strip 3. The sensor 6 detects the feed speed of the narrow tape 2 and/or the strip 3, as well as automatically adjusting the ultrasound sealing intensity according to this speed, by means of a logic unit 18. The sensor 6, which may include, for example, a decoder attached to the aforementioned timing shaft, acts upon the frequency of the generator.

Contrast means 4 are envisaged at the heatsealing means 5, so that the overlapping narrow tape 2 and strip 3 are fed to the sealing unit 15 between the contrast means 4 and the ultrasound heatsealing means 5.

In the embodiment illustrated in FIG. 3, the contrast means 4 consist of a fixed element 9, while in the embodiment in FIG. 4, they consist of the curved surface of a rotating cylinder 10 with axis normal to the feed trajectory of the narrow tape 2 and strip 3 where they pass through the sealing unit 15.

In this case, the unit 15 is defined by a concave sealing surface 16, set opposite the aforementioned curved surface of the cylinder 10 and with a radius of curvature substantially equal to the radius of the cylinder 10 itself.

The infeed of the sealing unit 15 may be fitted with at least one pair of opposite guide rollers 17, between which both the narrow tape 2 and the strip 3 are passed. The curved surface of at least one of the opposite rollers 17, usually that located on the same side as the narrow tape 2, may have at least one groove which extends over the entire circumference to house the narrow tape 2 and guide it towards the sealing unit 15.

We claim:

1. A method for sealing a narrow tape, having opposite longitudinal edges, to a heat-sealable strip which is broader than the tape, at a location which is spaced from both longitudinal edges of the strip, comprising the steps of:

feeding the narrow tape and the heat-sealable strip at a same speed longitudinally along respective paths which converge at a heat sealing station, so as to cause said narrow tape to facially engage the heat-sealable strip in said heat sealing station, with said narrow tape correctly positioned for being sealed in said sealing station to said heat-sealable strip;

in said sealing station, facially joining said narrow tape and said heat-sealable strip completely across the width of the narrow tape by applying ultrasonic energy thereto using an ultrasound sealer, at a zone where, as a result of convergence of said paths, said narrow tape overlaps and facially engages said heat-sealable strip, by directing ultrasound from said ultrasound sealer at said zone, to create a tape-bearing strip; and feeding the tape-bearing strip longitudinally thereof from the heat-sealing station.

2. The method of claim 1, wherein:

said directing includes causing said ultrasound energy to be applied in said zone within a width which is approximately equal in width to said narrow tape.

3. The method of claim 1, further comprising:

sensing the speed of feeding of at least one of said narrow strip and said heat-sealing strip into said heat-sealing station; and automatically adjusting the intensity of said applying of ultrasonic energy in relation to said speed as sensed by said sensing.

4. A device for sealing a narrow tape, having opposite longitudinal edges, to a heat-sealable strip which is broader than the tape, at a location which is spaced from both longitudinal edges of the strip, comprising the steps of:

a heat-sealing station;

an infeeding feeder arranged for feeding the narrow tape and the heat-sealable strip at a same speed longitudinally along respective paths which converge at said heat sealing station, so as to cause said narrow tape to facially engage the heat-sealable strip in said heat sealing station, with said narrow tape correctly positioned for being sealed in said sealing station to said heat-sealable strip;

in said sealing station, facially joining said narrow tape and said heat-sealable strip completely across the width of the narrow tape by applying ultrasonic energy thereto using an ultrasound sealer, at a zone where, as a result of convergence of said paths, said narrow tape overlaps and facially engages said heat-sealable strip, by directing ultrasound from said ultrasound sealer at said zone, and thereby causing said ultrasound energy to be applied in said zone with a width which is approximately equal in width to said narrow tape, to create a tape-bearing strip; and an out feeding feeder arranged for feeding the tape-bearing strip longitudinally thereof from the heat-sealing station.

5. The device of claim 4, further comprising:

at least one sensor arranged for sensing the speed of feeding of at least one of said narrow strip and said heat-scaling strip into said heat-scaling station; and a control unit operatively connected with said at least one sensor and said ultrasound sealer, for automatically adjusting the intensity of said applying of ultrasonic energy by said ultrasound sealer in relation to said speed as sensed by said at least one sensor.

6. The device of claim 4, wherein:

said ultrasound sealer is arranged to practice said applying of ultrasonic energy by having a generator arranged to send an alternating current, at a selected frequency, to a sound vibration transducer; and said control unit is arranged to perform said automatic adjusting by varying selection of said selected frequency.

7. The device of claim 4 further comprising:

an anvil arranged in said heat sealing station on an opposite side of said converging paths from said ultrasound sealer.

8. The device of claim 7, wherein:

said anvil comprises a rotational cylinder having an outer peripheral surface having a given radius of curvature; and said ultrasound sealer has a surface confronting said outer peripheral surface, which is concavely curved so as to have a radius of curvature which is substantially equal to that of said outer peripheral surface.

9. The device of claim 4, wherein:

said infeeding feeder includes at least one pair of opposite guide rollers, one roller of which is arranged to run in engagement with the narrow tape; said one roller being circumferentially grooved two accept said narrow tape towards said heat-sealing station.

* * * * *